United States Patent [19]
Lackowski

[11] Patent Number: 5,323,984
[45] Date of Patent: * Jun. 28, 1994

[54] FERROMAGNETIC INSERT FOR USE WITH A MAGNETIC TAPE CARTRIDGE AND METHOD OF MANUFACTURING THE SAME

[76] Inventor: Robert Lackowski, 1411 S. Redwood Dr., Mt. Prospect, Ill. 60056

[ * ] Notice: The portion of the term of this patent subsequent to Jun. 9, 2010 has been disclaimed.

[21] Appl. No.: 2,866

[22] Filed: Jan. 15, 1993

Related U.S. Application Data

[63] Continuation-in-part of Ser. No. 857,505, Mar. 25, 1992.

[51] Int. Cl.$^5$ ............... G11B 23/037; G11B 23/07
[52] U.S. Cl. ................... 242/197; 242/71.8; 242/68.5; 411/531
[58] Field of Search ............ 242/197, 198, 199, 68.5, 242/71.8, 68.3; 411/531, 544, 154, 155; D8/399

[56] References Cited

U.S. PATENT DOCUMENTS

| | | | |
|---|---|---|---|
| 2,943,661 | 7/1960 | Stern | 411/134 |
| 3,298,625 | 1/1967 | Babcock | 242/71.8 |
| 3,856,066 | 12/1974 | Reynolds | 411/155 |
| 4,254,922 | 3/1981 | Wolf et al. | 242/194 |
| 4,343,441 | 8/1982 | Graham | 242/68.1 |
| 4,376,606 | 3/1983 | Peterson | 411/531 X |
| 4,723,731 | 2/1988 | Posso | 242/197 |
| 4,970,748 | 11/1990 | Rubey | 15/97.1 |
| 5,029,771 | 7/1991 | Ranoia | 242/197 |

FOREIGN PATENT DOCUMENTS

| | | | |
|---|---|---|---|
| 103274 | 1/1925 | Austria | 411/531 |
| 1186464 | 4/1970 | United Kingdom | 411/531 |

*Primary Examiner*—Daniel P. Stodola
*Assistant Examiner*—John Q. Nguyen
*Attorney, Agent, or Firm*—Burns, Doane, Swecker & Mathis

[57] ABSTRACT

An insert that is to be mounted on a hub of a spool positioned in a magnetic tape cartridge for permitting the spool to be attracted to the magnetic element of a computer drive mechanism includes a circular ferromagnetic disk having oppositely positioned upper and lower planar surfaces. The disk is provided with a centrally positioned through hole, and a plurality of recesses disposed radially outwardly of the centrally positioned through hole. Each recess is provided with a securing through hole for permitting the ferromagnetic disk to be secured to the spool hub of a magnetic tape cartridge. The disk can also include an annular flange that extends around the outer periphery of the disk and axially away from the upper surface, and an annular flange that surrounds the centrally positioned hole and extends axially away from the upper surface. Each of the recesses is defined by an inclined side wall that extends axially away from the upper surface of the disk and radially inwardly toward the longitudinal axis of the respective securing through hole.

20 Claims, 3 Drawing Sheets

FERROMAGNETIC INSERT FOR USE WITH A MAGNETIC TAPE CARTRIDGE AND METHOD OF MANUFACTURING THE SAME

This application is a continuation-in-part of application Ser. No. 07/857,505 filed on Mar. 25, 1992.

FIELD OF THE INVENTION

The present invention pertains to an insert for use with a magnetic tape cartridge. More particularly, the present invention relates to a ferromagnetic insert that is to be attached to the hub of a spool positioned within a magnetic tape cartridge for permitting the spool to be attracted to a magnetic element of a computer drive mechanism to thereby result in rotation of the spool.

BACKGROUND OF THE INVENTION

It is known that the storage of data on a recording medium can be accomplished through use of magnetic storage techniques. Magnetic tape is highly desirable because it provides a good medium for storing large amounts of computer data and information. Typically, these magnetic tapes are stored in magnetic tape cartridges. One type of magnetic tape cartridge that is widely used in the industry is referred to as the 3480 cartridge or data card. This type of magnetic tape cartridge is illustrated in FIG. 1.

The cartridge 10 includes a housing 12 having an opening 14 in one corner for permitting the passage of the magnetic tape in and out of the cartridge 10. A centrally positioned opening 16 is provided in the housing 12 to permit access to a unit 18 that is engaged by a computer drive mechanism (not shown) for winding and unwinding the magnetic tape.

As seen in more detail in FIG. 2, the unit 18 includes a spool 20 that is adapted to receive the magnetic tape (not shown). The spool 20 is provided with a hub 22 having teeth 24 on the outer face thereof. These teeth 24 extend around the outer periphery of the hub 22. The hub 22 is also provided with teeth 26 on the inner surface thereof that are adapted to mate with teeth 28 provided on a locking mechanism 30.

The locking mechanism 30 is provided with a hollow stem 32 that is received on an upstanding lug 34 which is fixed to the housing 12. A spring 36 encircles the outer surface of the stem 32 and provides a biasing force that tends to urge the locking mechanism 30 towards the opening 16 in the housing 12. The upstanding lug 34 and the hollow portion of the stem 32 are suitably shaped to ensure that the locking mechanism 30 does not rotate relative to the housing 12.

When the cartridge 10 is not in use (i.e., is not positioned within a computer drive), the spring 36 urges the locking mechanism 30 towards the opening 16 such that the teeth 28 on the locking mechanism 30 engage the teeth 26 provided on the hub 22. In that way, the spool 20 is prevented from rotating. On the other hand, when the cartridge 10 is positioned within the computer drive (not shown) an element on the driving mechanism engages a projection 38 formed on the locking mechanism 30 and pushes the locking mechanism 30 away from the hub 22 of the spool 20. As a result, the teeth 28 on the locking mechanism 30 become disengaged from the teeth 26 on the hub 22 so that the spool 22 is free to rotate.

The driving mechanism (not shown) is provided with teeth that engage the teeth 24 on the hub 22 of the spool 20 in order to drive the spool 20 and thereby result in winding or unwinding of the magnetic tape around the spool 20.

The front face of the spool hub 22 has a ferromagnetic insert 40 secured thereto. The drive mechanism (not shown) is provided with a magnetic portion that attracts the ferromagnetic insert 40, and thus the spool 20, so as to result in engagement of the teeth on the drive mechanism (not shown) with the teeth 24 on the spool hub 22.

As can be seen in FIG. 1, the ferromagnetic insert 40 is provided with a centrally located opening 42 for permitting access to the projection 38. The insert 40 is also provided with several other holes 44 for securing the ferromagnetic insert 40 to the plastic hub 22. The spool hub 22 is typically fabricated of plastic material and can be provided with upstanding plugs that extend through the holes 44 in the ferromagnetic insert 40. Once the ferromagnetic disk 40 is mounted on the spool hub 22 with the plastic plugs extending through the holes 44, the plastic plugs on the hub 22 can be heated and slightly melted in any suitable way, such as by sonic welding, so that the plastic fills the holes 44. In this way, the insert 40 becomes attached to the hub 22.

Referring to FIG. 3, the holes 44 in the insert 40 are typically formed by first punching the insert 40 to result in holes having a diameter that is slightly smaller than the ultimate diameter. Thereafter, a punching operation is performed from both sides of the insert 40 with a slightly larger punch so as to result in holes 44 having the desired diameter. This finishing punch operation results in the formation of annular ridges 46 on the inner surface of the holes 44. These annular ridges help provide a positive attachment of the plastic plugs on the spool hub to the disk 44.

In practice, it is necessary that this finishing punch operation be performed from both sides of the insert 40 to ensure that the resulting insert 40 is symmetrical (i.e., symmetrical about a plane located midway between opposite faces of the insert). In that way, the insert 40 can be mounted on the spool hub with either of the faces of the insert facing the spool hub. If this finishing punch operation were only carried out from one side of the insert, the result would be a non-symmetrical insert (i.e., non-symmetrical about a plane located midway between opposite faces of the insert). Such a non-symmetrical insert could only be mounted on the spool hub in one way and would require painstaking effort to ensure that the insert 40 is positioned on the hub 22 in the appropriate manner. Such painstaking efforts would not be conducive to facilitating attachment of the inserts 40 to the hub 22 in a relatively expedient and possibly automated manner.

Unfortunately, there are several disadvantages associated with the known types of ferromagnetic inserts such as illustrated in FIG. 3. In one respect, since the finishing punch operation is carried out from both sides of the insert 40, the resulting insert typically includes two annular ridges 46 that are spaced apart by a space 48. During use, when the ferromagnetic insert 40 is attracted to the magnetic element on the computer driving mechanism, the insert 40 must be able to withstand a certain pull-out force. In that regard, the spaced-part annular ridges 46 and their interaction with the plastic plugs extending from the hub 22 may not be sufficient to withstand this pull-out force. Indeed, the relatively thin nature of the annular ridges 46 may not be capable of withstanding the repeated force that tends to pull the insert 40 away from the spool hub. Moreover, since the annular ridges 46 only extend a very short distance towards the center of the hole 44, the annular ridges 46 may not provide sufficient interaction with the plastic plugs on the spool hub so as to withstand the repeated force that tends to pull the disk 40 away from the spool hub. Over time, this may result in loosening of the insert 40 relative to the spool hub 22.

Another disadvantage associated with the known type of insert 40 is that it is relatively costly to manufacture. This derives from the fact that the thickness of the insert 40 is 1.55 mm. As the inventor herein has discovered, the function served by the insert 40 does not require that the insert 40 possess such a thickness. Indeed, it has been found that certain advantages can actually be achieved by fabricating the insert to have a much smaller thickness.

SUMMARY OF THE INVENTION

In light of the foregoing, the present invention provides a ferromagnetic insert for use with magnetic tape cartridges that is much less expensive and that is much better suited to remaining securely attached to the spool hub of the magnetic tape cartridge, even after repeated and extensive use.

In accordance with one aspect of the present invention, a magnetic tape cartridge for housing a tape which is adapted to have data stored thereon includes a housing, and a rotatable spool that is positioned within the housing and adapted to have the magnetic tape wound thereon. The spool includes a hub that is provided with means for being engaged by a computer drive mechanism to rotatably drive the spool. A ferromagnetic disk is mounted on the spool hub for allowing the spool to be attracted to a magnetic element of a computer drive mechanism. The ferromagnetic disk possesses oppositely facing upper and lower surfaces, an outer periphery and an annular flange extending axially away from the outer periphery of the disk. The disk is also provided with a plurality of recesses, each of which is provided with a securing through hole formed therein through which plugs on the spool hub can extend to secure the disk to the spool hub. The recesses in the disk are defined by a sidewall that extends axially away from the upper surface of the disk and radially inwardly towards the axis of the respective securing through hole.

In accordance with the preferred embodiment of the present invention, the annular flange extending from the outer periphery of the disk has a free end that is turned radially outwardly away from the longitudinal axis of the disk. Also, the ferromagnetic disk can be made of material having a thickness less than 1.35 mm, preferably between 0.15 mm and 0.50 mm.

In accordance with another aspect of the present invention, an insert for attachment to a hub of a spool positioned in a magnetic tape cartridge in order to permit the spool to be attracted to a magnetic element of a computer drive mechanism includes a circular ferromagnetic disk having oppositely positioned upper and lower surfaces. The disk is provided with a centrally disposed through hole for allowing a portion of the drive mechanism to contact a locking mechanism forming a part of the magnetic tape cartridge. The disk is also provided with a plurality of spaced apart recesses located radially outwardly of the centrally positioned through hole. Each of those recesses has a securing through hole formed therein for securing the disk to the spool hub. Each of the recesses in the disk is defined by a side wall that extends axially away from the upper surface of the disk and radially inwardly toward the longitudinal axis of the respective securing through hole.

In the preferred embodiment, the disk is provided with three recesses that are equally spaced from one another and equally spaced from the centrally positioned through hole. The disk is also provided with an outer periphery and an annular flange that extends axially away from the outer periphery of the disk. The disk can also include an annular flange that extends around the centrally positioned through hole and axially away from the upper surface of the disk.

In accordance with an additional aspect of the present invention, a method of fabricating an insert for attachment to a spool hub of a magnetic tape cartridge for permitting the spool to be attracted to a magnetic element forming a part of a computer drive mechanism includes the steps of providing a strip of ferromagnetic material having oppositely positioned first and second surfaces, and piercing the strip of ferromagnetic material to form a plurality of through holes that includes a centrally positioned through hole and a plurality of securing through holes radially outwardly disposed with respect to the centrally positioned through hole. In addition, the strip of ferromagnetic material is countersunk at a plurality of places that correspond to the securing through holes to form a plurality of recesses in the strip, each of which surrounds one of the securing through holes. Each of the recesses includes an inclined side wall that extends axially away from the first surface and radially inwardly toward a longitudinal axis of the securing through hole. A circular disk can then be punched out of the strip of ferromagnetic material to form the insert.

In accordance with another aspect of the present invention, a method of fabricating a spool that is used in a magnetic tape cartridge to receive magnetic tape involves providing an insert that is to be attached to a hub of the spool for permitting the spool to be attracted to an element forming a part of the computer drive mechanism. The insert includes a circular ferromagnetic disk having oppositely positioned upper and lower surfaces, a centrally positioned through hole, and a plurality of recesses. Each of the recesses possesses an inclined side wall that extends axially away from the upper surface of the disk and radially inwardly toward a longitudinal axis of the respective recess. The recesses are also provided with a securing through hole. The method of fabricating the spool also includes the step of securely attaching the ferromagnetic insert to the hub of the spool such that the lower surface of the disk faces the spool hub and such that plastic material extends through the securing through holes and is located in the recesses.

In accordance with a preferred embodiment, the method also involves providing a plastic spool having a spool hub and a plurality of plastic plugs extending from the spool hub. The step of securely attaching the disk to the spool hub includes positioning the disk relative to the spool hub such that each of the plastic plugs extends through one of the securing through holes, and heating the plastic plugs to soften them to the extent necessary to cause the plastic plugs to fill up the respective recess. Alternatively, the step of securely attaching the ferromagnetic insert to the spool hub can be performed by placing the insert in a mold for molding the spool and thereafter molding the spool and the insert together at the same time.

BRIEF DESCRIPTION OF THE DRAWING FIGURES

The foregoing aspects of the present invention in addition to others will become more apparent from the description that follows considered in conjunction with the accompanying drawing figures in which like reference numerals designate like elements and wherein.

DETAILED DESCRIPTION OF THE PREFERRED EMBODIMENTS

Figure 4:
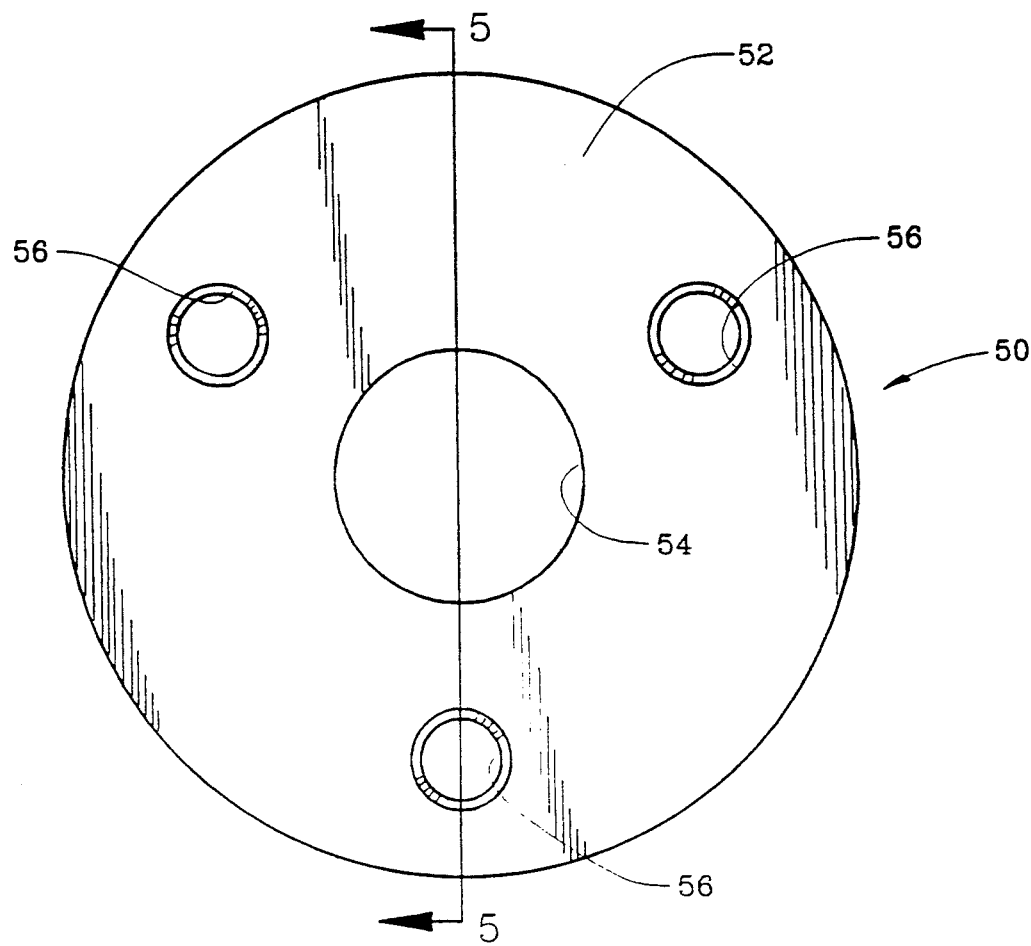
FIG. 4 is a top view of the ferromagnetic insert according to the present invention.

With reference initially to FIG. 4, the insert 50 in accordance with a preferred embodiment of the present invention for use with a magnetic tape cartridge includes a circular disk 52 of ferromagnetic material. The ferromagnetic disk 52 can be fabricated of 410 or 416 stainless steel, or any other suitable ferromagnetic material.

The ferromagnetic disk 52 is provided with a centrally positioned through hole or aperture 54 that extends completely through the disk 52. This centrally positioned through hole 54 permits access to the projection that is formed on the locking mechanism of the magnetic tape cartridge so that the locking element can be released when necessary to effect winding or unwinding of the magnetic tape on the spool.

The ferromagnetic disk 52 is also provided with three securing through holes 56 that allow the ferromagnetic disk 52 to be secured to the plastic hub of the spool. Each of the securing through holes 56 is positioned radially outwardly and at substantially equal instances from the center of the through hole 54. In addition, the securing through holes 56 are equally spaced from one another on an arc of approximately 120°. In that way, the securing through holes 56 are spaced apart from one another and relative to the centrally positioned through hole 54 in the same manner that the holes 42, 44 are positioned on the prior art disk illustrated in FIG. 3. As a result, the circular ferromagnetic disk 52 according to the present invention can be used in place of known inserts without the need for redesigning the hub on which the circular ferromagnetic disk 52 is mounted. Of course, the arrangement of the securing through holes 56 can be varied if desired, as can the number and shape of the securing through holes 56.

Figure 5:
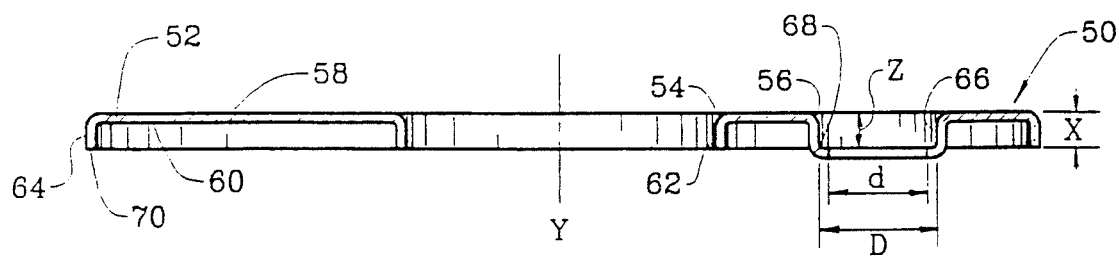
FIG. 5 is a cross-sectional view of the ferromagnetic insert according to the present invention along the section line 5—5 in FIG. 4.

As seen in the cross-sectional view of the disk depicted in FIG. 5, the disk 52 includes a first generally planar surface 58 and an oppositely positioned second generally planar surface 60. The centrally positioned through hole 54 is surrounded with an annular flange 62 that extends axially away from the first planar surface 54. This annular flange 62 surrounds the entire periphery of the centrally positioned through hole 54. Additionally, the outer periphery of the circular ferromagnetic disk 52 has an annular flange 64 extending axially away from the first planar surface 58. This axially extending annular flange 64 extends around the entire periphery of the circular ferromagnetic disk 52.

Each of the securing through holes 56 is also surrounded by an annular flange 66 that extends around the entire periphery of the respective securing through hole 56. These annular flanges 66 extend axially away from the first planar surface 58 and surround the entire periphery of the respective securing through hole 56. Each of the axially extending annular flanges 66 that surrounds the securing through holes 56 is provided with a radially inwardly directed annular shoulder 68.

These radially inwardly directed annular shoulders 68 result in the securing through holes 56 having a diameter D on the first planar surface 58 that is greater than the diameter d in the area of the inwardly directed annular shoulders 68. Thus, the inwardly directed shoulders 68 form a ledge which allows the plastic plugs on the hub of the spool to be strongly and securely seated in place once the circular ferromagnetic disk 52 is mounted on the spool and the plastic plugs are suitably heated and melted such as by sonic welding. The ledge formed by the inwardly directed annular shoulders 68 provides a much stronger mechanism for securely mounting the plastic plugs on the hub than do the annular ridges 46 that are formed in the through holes 44 of the prior art disk shown in FIG. 3. This contributes to an increased pull-out resistance of the ferromagnetic disk 52 relative to the spool hub. By way of example, the shoulders 68 can have a dimension measured radially inwardly toward the center of the securing through hole 56 of approximately 0.75 mm.

It is to be noted that the annular flanges 66 that surround the securing through holes 56 extend axially away from the first planar surface 58 by a distance that is slightly greater than the distance which the annular flanges 62, 64 surrounding the centrally positioned through hole 54 and the periphery of the disk 52 respectively extend axially away from the first planar surface 58.

There are several significant advantages associated with the ferromagnetic disk 52 according to the present invention as illustrated in FIGS. 4 and 5. In one respect, the disk is much thinner than known disks and this reduction in material significantly reduces the costs associated with fabricating this portion of the magnetic tape cartridge. The thickness throughout the ferromagnetic disk is less than 1.35 mm and is preferably less than 1.0 mm. In practice, it has been found that the thickness of the ferromagnetic disk can be in the range of 0.15 mm and about 0.50 mm, with the preferred thickness of the disk being approximately 0.30 mm.

Figure 1:
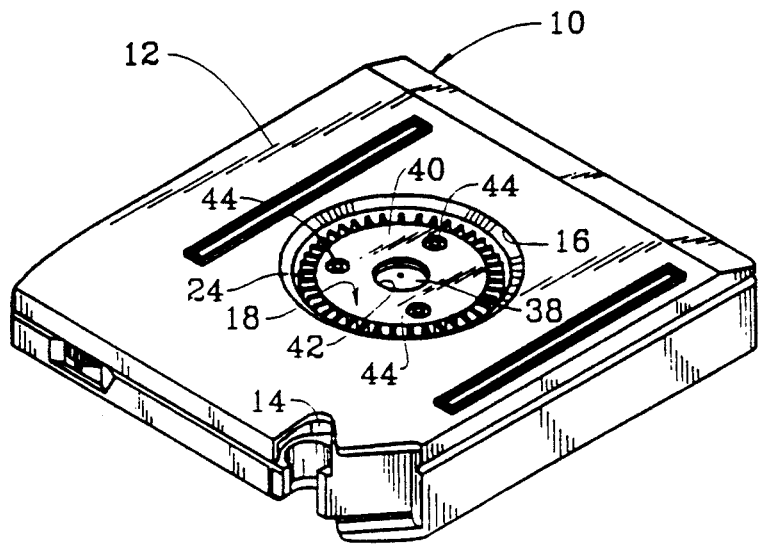
FIG. 1 is a top perspective view of a known type of magnetic tape cartridge.

By fabricating the disk of material having a thickness of approximately 0.30 mm, it has been found that the disk according to the present invention can be fabricated for less than one-half the cost associated with fabrication of prior art disks. Given the extensive and widespread use of magnetic tape cartridges of the type illustrated in FIGS. 1 and 2, this cost savings is quite significant to both manufacturers of the ferromagnetic disk as well as those that purchase the disk for use in the manufacture of magnetic tape cartridges. Additional cost savings can be realized through use of even thinner materials.

As can be readily seen from FIG. 5, the ferromagnetic disk 52 according to the present invention is also non-symmetrical about a median plane passing between the first and second planar surfaces 58, 60. This non-symmetrical design of the disk is useful in that it provides an easy and readily apparent mechanism for determining how the disk 52 should be mounted on the spool hub of the magnetic disk cartridge. In particular, the non-symmetrical nature of the ferromagnetic disk 52 according to the present invention provides a readily apparent mechanism for determining that the second planar surface 60 of the ferromagnetic disk 52 should face the spool hub of the magnetic tape cartridge. In this way, it is possible to employ automated machinery for mounting the ferromagnetic disks 52 on the spool hub of the magnetic tape cartridge.

Figure 3:
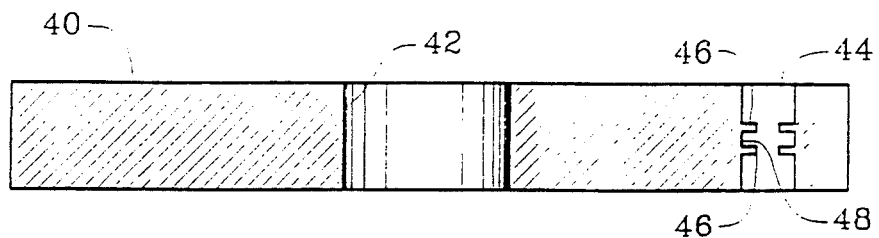
FIG. 3 is a cross-sectional view of a known type of ferromagnetic insert for use in conjunction with the magnetic tape cartridge shown in FIG. 1.

The axially extending annular flange 64 that surrounds the outer peripheral surface of the ferromagnetic disk 52 is advantageous in several respects. First, the distance x which the annular flange 64 extends away from the first planar surface 58 substantially corresponds to the thickness associated with prior art disks such as illustrated in FIG. 3. Thus, when mounted on the spool hub of the magnetic tape cartridge, the appearance of the disk 52 resembles the appearance of prior art known disks. In addition, the annular flange 64 serves the important function of preventing dust, dirt and the like from infiltrating into the interior of the magnetic tape cartridge. In the absence of the annular flanges 64, it might be possible for such undesirable particulate matter to pass between the surface of the spool hub and the undersurface (i.e., the second planar surface 60) of the ferromagnetic disk 52. Such foreign material could, of course, cause undesirable problems in the operation of the magnetic tape cartridge.

The annular flange 64 also contributes to maintaining substantially the same moment of inertia that is characteristic of the prior art ferromagnetic disk illustrated in FIG. 3. The standard adopted for the 3480 tape cartridge includes a particular requirement for the moment of inertia of the empty reel. As can be readily appreciated, by making the ferromagnetic disk 52 according to the present invention much thinner than prior art ferromagnetic disks, the moment of inertia of the disk, and consequently the moment of inertia of the empty reel, is affected. However, by providing the annular flange 64 which is located farthest from the rotational center of the disk 52, the moment of inertia of the disk 52, and consequently the moment of inertia of the empty reel, is maintained within acceptable limits and the established standards.

The annular flange 64 that surrounds the periphery of the disk 52, in combination with the annular flange 62 that surrounds the centrally positioned through-hole 54 and the annular flanges 66 that surround the securing through holes 56, also helps contribute significantly to strengthening the disk 52 and providing a much more rigid construction. Given the reduced thickness of the ferromagnetic disk 52 according to the present invention, the strength and rigidity provided by these flanges 62, 64, 66 is highly useful.

Another advantage realized as a result of the construction of the ferromagnetic disk 52 according to the present invention is that the disk 52 is much lighter than prior art known disks such as illustrated in FIG. 3. This reduction in mass allows a quicker response time of the spool in the direction perpendicular to the plane of the disk (i.e., in the direction along the axis Y as seen in FIG. 5). This in turn can reduce the time that is necessary to initiate engagement between the reel and the computer drive mechanism.

As was mentioned above, the radially inwardly directed shoulders 68 on the flanges 66 that surround the securing through holes 56 provide a ledge that is much better suited to securely and reliably attaching the disk 52 to the spool hub. In other words, the ledge formed by the radially inwardly directed shoulder 68 provides a much larger seating surface for the heated and melted plastic plugs on the spool hub, thereby resulting in the ferromagnetic disk 52 being more securely attached to the spool hub. It has been found that this arrangement allows the ferromagnetic disk 52 to withstand a pull-out force in excess of 300N which is the minimum pull-out force adopted as the standard for the 3480 cartridge. Moreover, because the annular shoulders 68 are spaced from the first planar surface 58 by a significant distance (represented as z in FIG. 5), there is a much greater volume that the plastic material of the plugs on the spool hub can fill when they are heated and slightly melted. This also contributes to a strong attachment of the disk 52 to the spool hub.

To manufacture the ferromagnetic insert 50 according to the present invention, various methods can be employed. In accordance with one preferred method, a multi-slide machine is employed. A strip of material that is slightly wider than the outside diameter of the resulting disk 52 is provided and pilot holes are punched in the strip of material to locate the strip through the multi-slide machine. Portions of the material corresponding to the location of the securing through holes 56 are then drawn to form three recesses or cups. This results in formation of the axially extending annular flanges 66. Thereafter, a hole having a diameter d is then perforated in the center of each of the drawn cups or recesses, thereby resulting in formation of the inwardly directed shoulders 68.

The center hole 54 can then be punched out, preferably with a size that is slightly smaller than the ultimate size of the through hole 54 so as to permit later formation of the axially extending annular flange 62. The material can be lanced to define the outer periphery of the circular disk 52. Preferably, the lancing operation is carried out to result in spaced apart connection points between the disk and the remaining strip of material. The strip of material is lanced such that the diameter of the lanced circle is slightly larger than the ultimate diameter of the disk 52, thereby allowing later formation of the axially extending annular flange 64. Thereafter, the lanced circular strip is blanked in an appropriate manner to produce the axially extending annular flange 64 on the outer periphery of the disk as well as the annular flange 62 that surrounds the centrally positioned through hole 54. The result is the ferromagnetic disk 52 according to the present invention as illustrated in FIG. 5.

Figure 6:
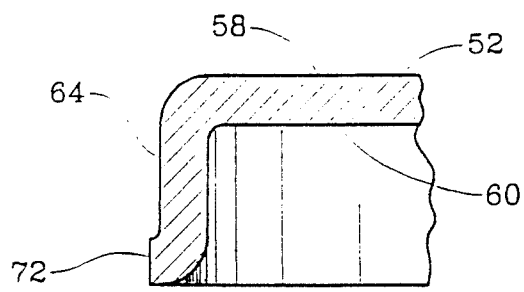
FIG. 6 is an enlarged cross-sectional view of another embodiment of the annular flange portion of the ferromagnetic disk according to the present invention.

As seen in FIG. 5, the axially extending annular flange 64 that surrounds the outer periphery of the disk 52 is constructed such that the free end 70 of the flange 64 lies in a plane that is substantially parallel to the first and second planar surfaces 58, 60 of the ferromagnetic disk 52. As an alternative, and as seen in FIG. 6, the free end 72 of the annular flange 64 can be turned outwardly such that the free end 72 of the annular flange 64 lies in a plane substantially perpendicular to the first and second planar surfaces 58, 60 of the disk 52.

Figure 7:
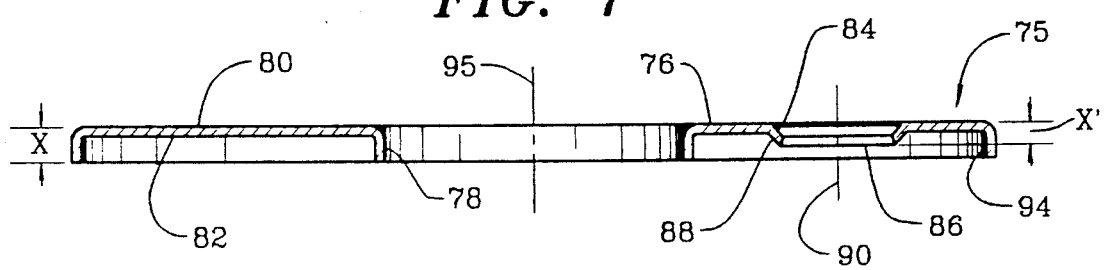
FIG. 7 is a cross-sectioned view of another embodiment of the ferromagnetic insert according to the present invention.
Figure 8:
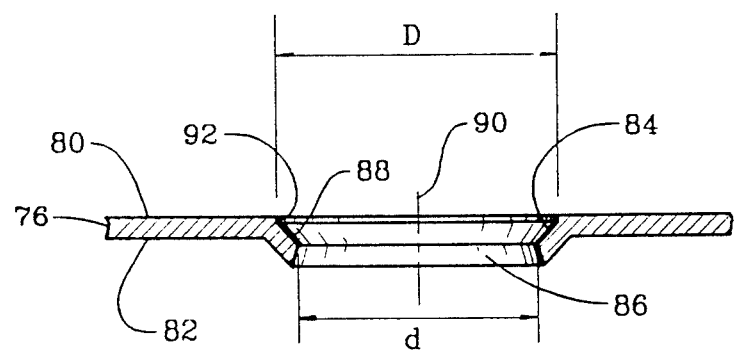
FIG. 8 is an enlarged cross-sectional view of a portion of the ferromagnetic insert illustrated in FIG. 7.

FIGS. 7 and 8 illustrate the ferromagnetic insert according to another embodiment of the present invention. The insert 75 is comprised of a generally circular disk 76 which can be made of 410 or 430 stainless steel or any other suitable ferromagnetic material. The disk 75 includes oppositely positioned and oppositely facing upper and lower planar surfaces 80, 82. Preferably, the outer diameter of the insert 75 corresponds substantially to the outer diameter of other known inserts which is approximately 35.25 mm.

Figure 2:
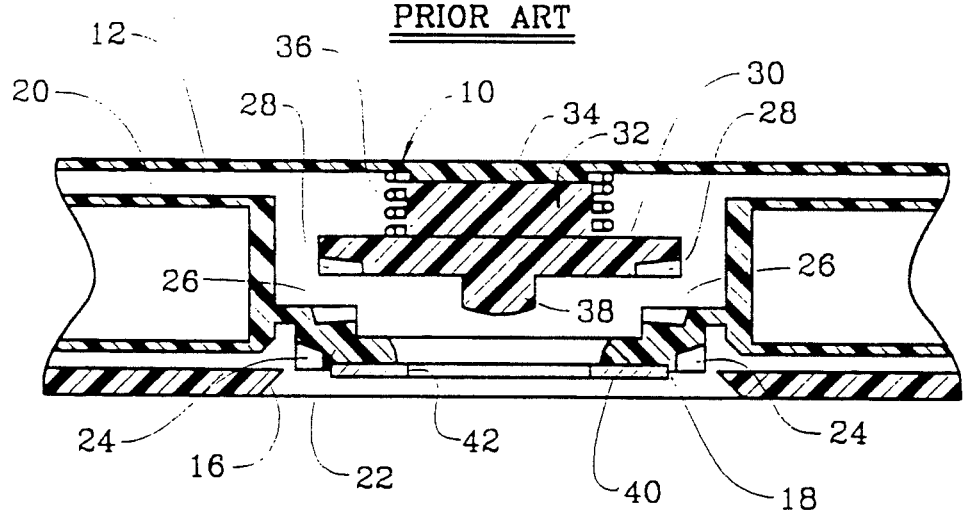
FIG. 2 is a cross-sectional view of a portion of the magnetic tape cartridge illustrated in FIG. 1.

The ferromagnetic disk 75 is provided with a generally centrally located through hole 78 for permitting access to the projection 38 (see FIG. 2) on the locking mechanism 30 (see FIG. 2). In that way, the locking mechanism can be released when necessary to permit winding or unwinding of the magnetic tape on the spool. An annular flange 78 extends around the inner periphery of the through hole 78 and extends axially away from the upper surface 80 of the disk 76.

The ferromagnetic disk 75 is also provided with a plurality of recesses 84, only one of which is illustrated in FIG. 7. Preferably, three recesses 84 are provided. The plurality of recesses 84 are arranged on the disk 76 in substantially the same manner as the securing through holes 56 illustrated in FIG. 4. That is, the recesses 84 are equally spaced apart from one another at approximately 120° intervals and are spaced from the centrally positioned through hole 78 at equal distances.

FIG. 8 is an enlarged view of one of the recesses 84 and is representative of each of the recesses. Each of the recesses 84 has a securing through hole 86 formed therein. The securing through holes 86 provide an arrangement for securing the ferromagnetic disk 75 to the spool hub 22 (see FIG. 2). As described above, the spool hub 22 can include a plurality of upstanding plastic plugs. One of those plastic plugs is adapted to extend through each of the securing through holes 86, whereupon the plastic plugs are heated and slightly melted so that the plastic fills (i.e., flows into) the respective recess 84. In that way, the ferromagnetic disk 75 can be secured to the spool hub 22. Other alternative methods such as an insert molding technique can be employed to secure the insert 75 to the spool hub 22. In that alternative method, the spool 22 is molded around the insert 75 so that the insert is attached to the spool when the spool is removed from the mold.

As further illustrated in FIG. 8, each of the recesses 84 is defined by an inclined side wall 88 that extends axially away from the upper surface 80 while also extending radially inwardly toward the longitudinal axis 90 of the respective securing through hole 84 and recess 86. Adjacent the upper surface 80 of the disk 76, the side wall 88 is provided with axially extending portion 92 that is substantially parallel to the longitudinal axis 90 of the recess 84 and the securing through hole 86.

Like the embodiment of the insert illustrated in FIG. 5, the embodiment of the insert depicted in FIG. 7 includes an annular flange 94 that extends axially from the outer periphery of the disk 76. That annular flange 94 extends around the entire outer periphery of the disk 76 in a direction away from the upper surface 80 of the disk 76. The annular flange 94 in combination with the flange 78 and side wall 88 which defines each of the recesses 84 contributes to strengthening and stiffening the ferromagnetic insert 75 to thereby result in a substantially rigid construction. In light of the fact that the thickness of the ferromagnetic insert of the present invention is significantly reduced as compared to the thickness of other known inserts such as that illustrated in FIG. 3, the strength and rigidity made possible by the annular flanges 78, 94 and the side walls 88 is quite advantageous.

The axially extending annular flange 94 that surrounds the outer periphery of the ferromagnetic disk 76 also affords the other advantages such as those mentioned above with respect to the embodiment illustrated in FIG. 5. That is, the dimension x of the ferromagnetic insert 75 corresponds substantially to the thickness associated with other known inserts such as the one illustrated in FIG. 3. As a result, when mounted on the spool hub, the appearance of the insert 75 resembles the appearance of other known inserts. In addition, the annular flange 94 is highly useful in preventing the ingress of dust, dirt, and other similar material into the interior of the magnetic tape cartridge.

The annular flange 94 is also useful in defining a moment of inertia for the ferromagnetic insert 75 that is substantially the same as the moment of inertia associated with known types of inserts such as the one illustrated in FIG. 3. That is important from the standpoint that the standards which have been adopted for the 3480 magnetic tape cartridge include a specific requirement for the moment of inertia of the empty reel. By designing the ferromagnetic insert 75 of the present invention so that its moment of inertia substantially matches that of other known ferromagnetic inserts, it is not necessary to change or modify other aspects of the reel in order to meet the moment of inertia standard.

The embodiment of the ferromagnetic insert 75 shown in FIGS. 7 and 8 can be designed with an annular flange having the configuration shown in FIG. 6. That is, the free end of the annular flange 94 can be turned radially outwardly away from the longitudinal axis 95 of the disk so that the free end of the annular flange 94 lies in a plane substantially perpendicular to the upper and lower surfaces 80, 82 of the disk 76.

The thickness of the material used to manufacture the ferromagnetic insert 75 in accordance with the embodiment illustrated in FIGS. 7 and 8 can be substantially the same as that used to manufacture the insert embodied in FIG. 5. That is, the thickness of the material can be less than 1.35 mm and is preferably less than 1.0 mm. More specifically, it has been found in practice that the thickness of the ferromagnetic disk can be in the range of about 0.15 mm and about 0.50 mm, with the preferred thickness of the disk being approximately 0.30 mm. Such a reduction in thickness provides all of the advantages mentioned above with respect to the embodiment of the ferromagnetic insert illustrated in FIG. 5. Stainless steel or any other suitable ferromagnetic material can be employed to manufacture the insert 75.

As can be seen in FIG. 7, the distance x' that the side wall 88 extends downwardly away from the upper surface 80 is less than the depth x of the ferromagnetic insert 75. Also, the side wall 88 defining each of the recesses 84 can be inclined at an angle of approximately 45°.

As in the case of the embodiment of the ferromagnetic insert 75 illustrated in FIG. 5, the ferromagnetic insert 75 illustrated in FIGS. 7 and 8 is non-symmetrical about a median plane passing between the upper and lower surfaces 80, 82. That non-symmetrical configuration can be used advantageously as a mechanism for determining the proper way in which to mount the ferromagnetic insert on the spool hub. As a result, it is possible to employ automated machinery to mount the ferromagnetic insert 75 on the spool hub of the magnetic tape cartridge.

In practice, it has been found useful to construct the disk 76 such that each of the recesses 84 opens to the upper surface 80 of the disk with a dimension D of approximately 4.0–4.1 mm. On the other hand, the disk can be fabricated such that the diameter d of each of the securing through holes 86 is approximately 3.3–3.4 mm. As a result of the differences between those two dimensions D, d, the recess 84 is generally of a truncated conical shape to receive and securely anchor the plastic material of the spool hub.

As briefly mentioned above, the ferromagnetic insert 75 can be attached to the spool hub in various ways. In one respect, the insert 75 can be positioned on the spool hub such that each one of a plurality of plastic plugs projecting from the spool hub extends through one of the securing through holes 86. Those plastic plugs can then be suitably heated and somewhat melted, such as by sonic welding, so that the plastic flows and fills the respective recess 84. Alternatively, an insert molding technique can be employed whereby the ferromagnetic insert 75 is placed directly in the mold and molded concurrently with the molding of the spool hub. In that way, plastic will fill each of the recesses 84 and extend through the securing through holes 86 to thereby securely attach the ferromagnetic insert 75 to the spool hub.

The embodiment of the ferromagnetic insert 75 illustrated in FIGS. 7 and 8 does, in some respects, afford certain advantages over the embodiment of the ferromagnetic insert shown in FIG. 5. In one respect, the embodiment of the ferromagnetic insert 75 illustrated in FIGS. 7 and 8 can be manufactured more quickly and easily than the embodiment shown in FIG. 5. To manufacture the ferromagnetic insert 75, a multi-slide machine can be used, although other types of machines such as a punch press can also be employed. A strip of metal is fed into the multi-slide machine whereupon the centrally located through holes 78 and the securing through holes 86 are pierced. Those holes can then be used to guide further movement of the metal strip through the multi-slide machine. Once the through holes 78, 86 have been pierced, the strip of material can be countersunk at three places to define the three recesses 84. Thereafter, the individual inserts can be punched from the strip and expelled from the machine. The annular flanges 94, 78 can be formed at any appropriate time during the process. For example the flange 94 extending axially from the outer periphery of the disk 76 can be formed by drawing material from the strip that generally corresponds in size to the insert 75.

The method used to manufacture the insert illustrated in FIGS. 7 and 8 is simpler in some respects as compared to the method used to manufacture the embodiment of the ferromagnetic insert illustrated in FIG. 5. As a result, a more simple and inexpensive machine can be utilized to fabricate the inserts. Consequently, the costs associated with fabricating the inserts can be reduced.

Moreover, the quality associated with the inserts illustrated in FIGS. 7 and 8 can be improved as compared to the quality of the insert illustrated in FIG. 5. For example, the drawing operation that is employed to make the flanges 66 in the embodiment of the insert illustrated in FIG. 5 can result in a series of rings on the disk which, at the very least, can impair the anesthetic appearance of the disk. More significantly, the drawing method used to fabricate the ferromagnetic insert illustrated in FIG. 5 results in a feathered edge in the region where the first planar surface 58 meets the annular flanges 66. In some situations, that feathered edge may not produce the type of quality that is desired. For example, when the ferromagnetic insert 75 is attached to the hub spool through insert molding, the leathered edge can result in the plastic being molded with respect to the ferromagnetic insert in such a way as to raise the possibility that small chips or particles of the plastic material can break off. Those small plastic chips or particles could cause a problem if they were to fall into the magnetic tape cartridge.

In the embodiment of the ferromagnetic insert 75 illustrated in FIGS. 7 and 8, the same drawing steps are not employed to form the recesses and consequently, the embodiment illustrated in FIGS. 7 and 8 is better suited to being attached to the spool hub by way of an insert molding operation. Indeed, the axially extending portion 92 of each of the recesses 84 helps ensure that no feathering exists on the ferromagnetic insert.

The principles, preferred embodiments and intended use of the present invention have been described in the foregoing specification. However, the invention which intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes and equivalents which fall within the spirit and scope of the present invention as defined in the claims, be embraced thereby.

What is claimed is:

1. A magnetic tape cartridge for housing magnetic tape which is adapted to have data stored thereon, comprising:

a housing;

a rotatable spool positioned within the housing and adapted to have tape wound therearound, said spool having a spool hub and including means for being engaged by a drive mechanism to rotatably drive the spool, said spool hub having a ferromagnetic disk mounted thereon for permitting the spool to be attracted to a magnetic element of a drive mechanism, said ferromagnetic disk having oppositely facing first and second surfaces, said disk having an outer periphery and an annular flange located at the outer periphery of said disk and extending away from the first surface, a centrally positioned through hole formed in the disk, an annular flange extending away from the first surface and extending around the centrally positioned through hole, and a plurality of recesses formed in the disk, each of said recesses having a securing through hole formed therein for allowing the disk to be secured to the spool, said securing through holes having an axis, said recesses being defined by an inclined side wall that extends axially away from said first surface and radially inwardly towards the axis of the respective securing through hole.

2. The magnetic tape cartridge according to claim 1, wherein said annular flange located at said outer periphery has a free end that is turned radially outwardly away from a longitudinal axis of the disk.

3. The magnetic tape cartridge according to claim 1, wherein said disk is made of a ferromagnetic material having a maximum thickness less than 1.35 mm.

4. The magnetic tape cartridge according to claim 1, wherein said disk is made of a ferromagnetic material having a maximum thickness between 0.15 mm and 0.50 mm.

5. The magnetic tape cartridge according to claim 4, wherein said material is stainless steel.

6. An insert for attachment to a hub of a spool positioned in a magnetic tape cartridge for permitting the spool to be attracted to a magnetic element of a drive mechanism, comprising a circular ferromagnetic disk having oppositely positioned first and second surfaces, said disk being provided with a centrally positioned through hole for allowing a portion of the drive mechanism to contact a locking mechanism forming a part of the magnetic tape cartridge, an annular flange extending away from the first surface and extending around the centrally positioned through hole, said disk being provided with a plurality of spaced apart recesses located radially outwardly of the centrally positioned through hole, each of said recesses having a securing through hole formed therein for securing the disk to the hub of the spool, said recesses having an inclined side wall that extends axially away from said upper surface and radially inwardly towards a longitudinal axis of the respective securing through hole.

7. The insert according to claim 6, wherein said disk is provided with three recesses equally spaced from one another and equally spaced from the centrally positioned through hole.

8. The insert according to claim 6, wherein said disk includes an outer periphery and an annular flange located at the outer periphery and extending away from the first surface of the disk.

9. The insert according to claim 8, wherein said annular flange located at said outer periphery has a free end that is turned radially outwardly away from a longitudinal axis of the disk.

10. The insert according to claim 9, wherein said disk is made of a ferromagnetic material having a maximum thickness less than 1.35 mm.

11. The insert according to claim 9, wherein said disk is made of a ferromagnetic material having a maximum thickness between 0.15 mm and 0.50 mm.

12. A method of fabricating an insert for attachment to a spool hub of a spool that forms a part of a magnetic tape cartridge for permitting the spool to be attracted to a magnetic element forming a part of a computer drive mechanism, comprising the steps of:
providing a strip of ferromagnetic material having oppositely positioned first and second surfaces;
piercing said strip of ferromagnetic material to form a plurality of through holes that includes a centrally positioned through hole and a plurality of securing through holes radially outwardly disposed with respect to said centrally positioned through hole;
countersinking said strip of ferromagnetic material at a plurality of places that correspond to said securing through holes to form a plurality of recesses in the strip, each of the recesses surrounding one of the securing through holes and each of the recesses including an inclined side wall that extends axially away from said first surface and radially inwardly toward a longitudinal axis of the securing through hole;
forming an annular flange that extends around the centrally positioned through hole and that extends away from the first surface; and
punching a circular disk of material from the strip to form the insert, said circular disk of material that is punched from the strip encompassing the centrally positioned hole, the securing through holes and the plurality of recesses.

13. The method according to claim 12, wherein said step of piercing the strip to form a plurality of securing through holes includes piercing said strip to form three through holes that are spaced from one another by substantially equal distances and spaced from the centrally positioned through hole by equal distances.

14. The method according to claim 13, including forming an axially extending annular flange along the entire outer periphery of the disk.

15. A magnetic tape cartridge for housing magnetic tape which is adapted to have data stored thereon, comprising:
a housing;
a rotatable spool positioned within the housing and adapted to have tape wound therearound, said spool having a spool hub and including means for being engaged by a drive mechanism to rotatably drive the spool, said spool hub having a disk mounted thereon for permitting the spool to be attracted to a magnetic element of a drive mechanism, said disk being made of a ferromagnetic material having a maximum thickness less than 1.35 mm, said disk having oppositely facing first and second surfaces, said disk having an outer periphery and an annular flange located at the outer periphery of said disk, said annular flange extending away from the first surface, and a plurality of recesses formed in the disk, each of said recesses having a securing through hole formed therein for allowing the disk to be secured to the spool, said securing through holes having an axis, said recesses being defined by an inclined side wall that extends axially away from said first surface and radially inwardly towards the axis of the respective securing through hole.

16. The magnetic tape cartridge according to claim 15, wherein said ferromagnetic disk is made of material having a thickness between 0.15 mm and 0.50 mm.

17. An insert for attachment to a hub of a spool positioned in a magnetic tape cartridge for permitting the spool to be attracted to a magnetic element of a drive mechanism, comprising a circular disk having oppositely positioned first and second surfaces, said disk being made of a ferromagnetic material having a maximum thickness less than 1.35 mm, said disk being provided with a centrally positioned through hole for allowing a portion of the drive mechanism to contact a locking mechanism forming a part of the magnetic tape cartridge, an annular flange extending around an outer periphery of the disk and extending away from the first surface, said disk being provided with a plurality of spaced apart recesses located radially outwardly of the centrally positioned through hole, each of said recesses having a securing through hole formed therein for securing the disk to the hub of the spool, said recesses having an inclined side wall that extends axially away from said upper surface and radially inwardly towards a longitudinal axis of the respective securing through hole.

18. The insert according to claim 17, wherein said disk is provided with three recesses equally spaced from one another and equally spaced from the centrally positioned through hole.

19. The insert according to claim 17, wherein said disk is made of a material having a thickness between 0.15 mm and 0.50 mm.

20. The insert according to claim 17, wherein said disk includes an annular flange that extends axially away from the upper surface and around the centrally positioned through hole.

* * * * *